Figure 1:
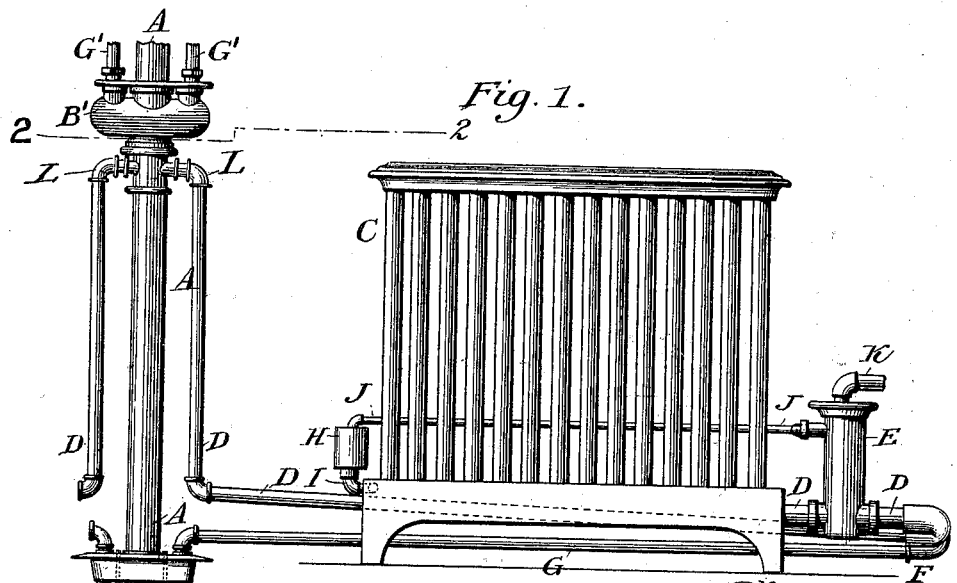

No. 624,526. Patented May 9, 1899.
E. F. OSBORNE.
STEAM HEATING APPARATUS.
(Application filed Aug. 20, 1898.)
(No Model.) 2 Sheets—Sheet 1.

Witnesses.
G. S. Noble
Flora L. Brown.

Inventor.
Eugene F. Osborne,
By Charles Turner Brown,
Atty.

No. 624,526. Patented May 9, 1899.
E. F. OSBORNE.
STEAM HEATING APPARATUS.
(Application filed Aug. 20, 1898.)
(No Model.) 2 Sheets—Sheet 2.
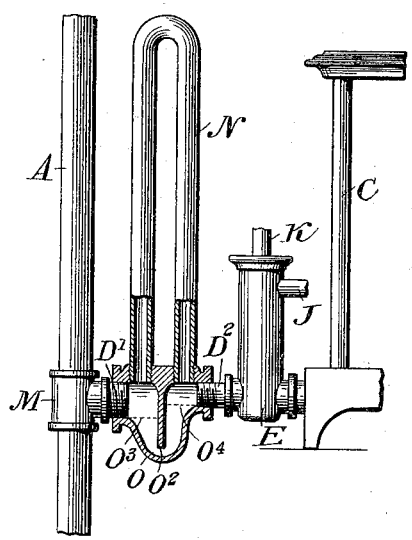
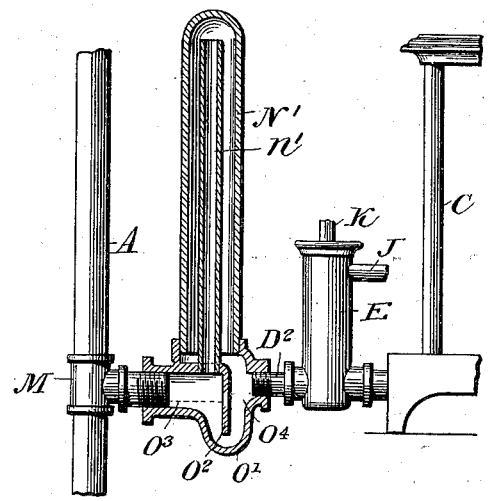
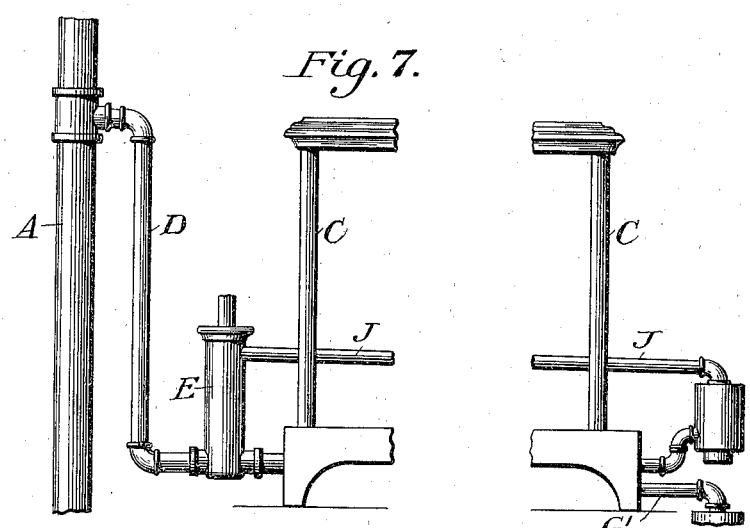
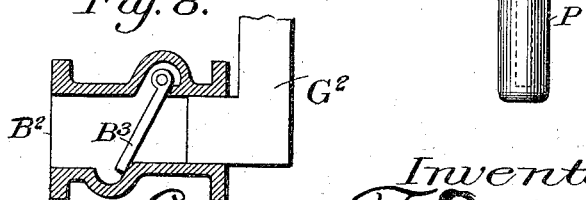
Witnesses.
G. S. Noble,
Flora L. Brown.
Inventor.
Eugene F. Osborne,
By Charles Turner Brown,
Atty.

UNITED STATES PATENT OFFICE.

EUGENE F. OSBORNE, OF CHICAGO, ILLINOIS, ASSIGNOR TO THE OSBORNE STEAM ENGINEERING COMPANY, OF SAME PLACE.

STEAM HEATING APPARATUS.

SPECIFICATION forming part of Letters Patent No. 624,526, dated May 9, 1899.

Application filed August 20, 1898. Serial No. 689,152. (No model.)

*To all whom it may concern:*

Be it known that I, EUGENE F. OSBORNE, a citizen of the United States, residing at Chicago, in the county of Cook and State of Illinois, have invented certain new and useful Improvements in Heating Apparatus, of which the following, when taken in connection with the drawings accompanying and forming a part hereof, is a full and complete description sufficient to enable those skilled in the art to understand, make, and use the same.

This invention relates to steam heating apparatus wherein heat is obtained by radiation or conduction, or both, from a steam heating device, as a radiator, containing steam.

The object of this invention is to obtain a steam heating apparatus wherein steam will as the same is required to maintain a uniform temperature in the place or substance heated thereby be alternately and automatically admitted and discharged from the whole or from a part of the steam heating device forming an element in the apparatus and wherein when steam is admitted into such steam heating device it shall be drawn thereinto, as by suction, and when discharged therefrom it shall be forced out by a fluid piston, as air.

A further object of the invention, and a necessary one in carrying out of the foregoing named object, is to obtain a steam heating apparatus wherein air when used as a fluid piston for forcing the heating fluid (steam) out of the steam heating device of the apparatus will not be discharged or permitted to flow from such steam heating device back into the steam-supply pipe.

A further and what may be called a "detailed" object of the invention is to obtain means whereby an exponent of the force or pressure required to supply the steam heating device with steam from the steam-supply pipe shall be obtained, such exponent varying with the variation of the force or pressure required to supply such steam heating device with the steam, and a yet further object of the invention is to obtain a steam heating apparatus wherein the passage of air (when air is used as a fluid piston, as aforesaid) from the steam heating device of the
apparatus, along with water of condensation, to the place of discharge of such water of condensation will be prevented.

To obtain the results hereinbefore recited, I find it necessary to utilize a steam heating device wherein the steam will readily enter from a steam-supply when the fluid piston is withdrawn therefrom and from which the water of condensation will at all times be readily discharged back to such steam-supply, or, if preferred, to a water-of-condensation reservoir or receptacle by a pipe independent of the steam-supply pipe. I also find it necessary to utilize a water seal of a check-valve as a substitute therefor for the prevention of the passage of steam from the steam heating device back to the steam-supply along with the water of condensation discharged into such steam-supply pipe or the converse thereof—that is, to prevent the passage of steam through the water-of-condensation-discharge pipe from the steam-supply pipe into the steam heating device. I further find it necessary to utilize means to prevent the delivery of steam from the steam heating device along with water of condensation discharged therefrom to the water-of-condensation reservoir or receptacle when a discharge-pipe separate from the steam-supply pipe is used for the water of condensation, extending from the steam heating device to the reservoir for such water of condensation.

Figures 3, 4:
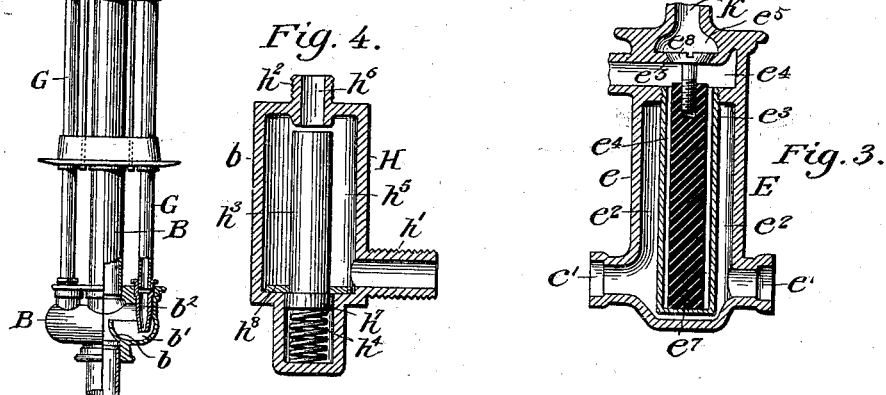
Figure 2:
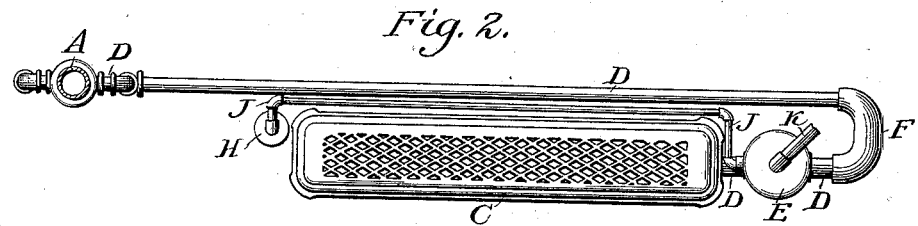

In the drawings referred to as illustrating the steam heating apparatus embodying this invention and in which a letter of reference applied to designate a given part is used to represent such part throughout the several figures of the drawings, Figure 1 is an elevation of a steam heating device, a steam-supply pipe, (riser,) the connections between the steam-supply and the steam heating device, and the attachments thereto; Fig. 2, a top plan view of the steam heating device and steam-supply pipe on line 2 2 of Fig. 1, looking downward; Fig. 3, a vertical sectional view of an air-valve which may be used in the apparatus embodying this invention; Fig. 4, a vertical sectional view of an air-valve which may well be used in the apparatus embodying this invention; and Figs. 5, 6, and 7 are elevations showing, respectively, modifications of the connections between the steam-supply and the steam heating device of the apparatus, Figs. 5 and 6 showing a portion of the connections therein illustrated, respectively, in vertical section. Fig. 8 is a vertical section of a check-valve which may be substituted for the water seal illustrated in the several foregoing figures of the device and which are hereinafter described.

A is a riser or steam-supply pipe.

B is a water seal on riser A.

C is a steam heating device, as a radiator, comprising loops or tubes joined at their base and joined or not joined at their upper ends, as preferred—that is, any ordinary radiator now in common use.

D, Fig. 1, is a steam-supply connection or branch pipe extending from steam-supply pipe or riser A to steam heating device C, and such connection has interposed therein, adjacent to the steam heating device, the thermostat device E and coupling F.

G is a water-of-condensation-discharge pipe extending from coupling F to water seal B and discharging through such water seal into the riser A.

H is an air-valve connected to the steam heating device C, as at I, and to the thermostat device E, as by pipe J.

K is a pipe connected to the thermostat device E and to a vacuum-producing apparatus and to a pressure-reservoir, (or pressure-producing apparatus.)

The vacuum apparatus, the pressure-producing apparatus, the pressure-reservoir, and the means for alternately connecting the same with the pipe K form no part of this invention and are not therefore illustrated in the drawings and will not be described in detail.

Before proceeding to describe the modifications illustrated in Figs. 5, 6, and 7 I will give a detail description of the several parts D E F G H and their connections and the operation thereof.

Connecting or branch pipe (or "connection D," as it is hereinafter termed) is attached to and communicates with the riser A in a plane above the plane to which air when used as a fluid piston is designed to rise at or adjacent to the thermostat device E in the operation of the apparatus—that is, in general terms, the height at which connection D is joined to riser A is nearly equal to the height of the steam heating device C.

In the modifications hereinafter described and illustrated in Figs. 5, 6, and 7 means are provided for retaining the air used as a fluid piston in the connection between the steam-riser A and the steam heating device (and so in the steam heating device at the end thereof adjacent to the connection) to obtain the height of air desired and required, even when the connection is made to the riser at the usual height—that is, at a height permitting the water of condensation to flow therethrough back to the riser.

Coupling F, interposed in the steam-supply connecting-pipe D, permits the passage of steam therethrough toward the steam heating device C, and also permits the passage therethrough of water of condensation from the steam heating device C to the water-of-condensation-discharge pipe G, which is connected thereto and communicates therewith.

The water seal B on the steam-supply pipe (as does also water seal B′) comprises a raised inner rim $b$, (see Fig. 1,) whereby well or water-receptacle $b'$ is obtained for the water of condensation necessary to form a water seal, and the nozzle $b^2$ to water seal B extends below the surface of water of condensation contained in the well $b'$. Water-of-condensation-discharge pipe G is connected to nozzle $b^2$. The water seal B is placed on riser A below the steam heating device C a sufficient distance to obtain in the water-of-condensation-discharge pipe G a water-leg, forming a balance to the difference of pressure existing between the riser A and coupling F at the point of attachment of such water-of-condensation pipe thereto. The water-leg thus obtained will also balance, in addition, any difference of pressure existing between the coupling F and the discharge-nozzle $b^2$ in the water-of-condensation-discharge pipe G. The coupling F is placed adjacent to the thermostat device, and such thermostat device is placed adjacent to the steam heating device, so that the pressure of steam in the steam heating device is substantially the same as is the pressure of steam in the coupling, and therefore the water-leg obtained constitutes, substantially, the exponent of the difference in pressure between the riser A and the steam heating device C, permitting steam to flow freely from the riser toward and into the steam heating device through the steam-supply connection-pipe D, and also permitting the water of condensation to flow freely from the steam heating device C to the water seal B through the water-of-condensation-discharge pipe G, and preventing the discharge of steam from the riser A through the water-of-condensation-discharge pipe G to the steam heating device C.

The thermostat device E, interposed in the steam-supply connection-pipe D, comprises the outer shell or casing $e$, (see Fig. 3,) having joints or couplings $e'\ e'$, with which pipe D connects, steam-chamber $e^2$ in shell or casing $e$, in which chamber the steam passing through pipe D circulates freely, and inner casing or shell $e^3$, preferably of metal or other heat-conducting material of comparatively low expansibility under the varying temperature to which it is subjected as compared with the expansibility of expansible member $e^7$. Chamber $e^4$ is formed by the shell or casing $e^3$. Chamber $e^4$ does not communicate with chamber $e^2$. Thermostat device E also comprises valve-seat $e^5$, valve $e^6$, and expansible member $e^7$, attached to valve $e^6$. There is also the chamber $e^8$ above the valve-seat $e^5$, with which chamber pipe K communicates. Pipe J communicates with chamber $e^4$.

Expansion member $e^7$, which is attached to valve $e^6$, is adjustable with reference to such valve, as by the screw-threads $e^9$, and such expansible member is not attached to the casing or shell $e^3$, so that when the pipe K is in communication with the low-pressure-producing apparatus such valve $e^6$, together with such expansion member, may be lifted and a low pressure be obtained in the pipe J and also in the steam heating device C. When from the presence of steam in chamber $e^2$ and by the conduction of heat therefrom through the shell or casing $e^3$ the temperature of chamber $e^4$ is raised sufficiently to expand expansion member $e^7$, the valve $e^6$ is raised from its seat, and in such case if pipe K is placed in communication with an air-pressure-producing apparatus or an air-pressure reservoir a corresponding pressure is obtained in the pipe J and through air-valve H, as hereinafter described, in the steam heating device C.

Air-valve H comprises (see Fig. 4) casing or shell $h$, screw-threaded projection $h'$, by which it may be secured to steam heating device C or to a pipe extending between it and such steam heating device, screw-threaded projection $h^2$, to which pipe J or a coupling therefor may be secured, expansible member $h^3$, and spring $h^4$ or its equivalent. Expansible member $h^3$ is mounted on spring $h^4$, so that when opening $h^6$ is closed by steam being contained in chamber $h^5$ further expansion of such member will retract spring $h^4$ and also so that when such opening $h^6$ is so closed if air under pressure is admitted to pipe J the spring will be retracted by such air, and expansible member $h^3$ being by such air under pressure forced back from its seat such air will be admitted through the air-valve and to the steam heating device C. The spring $h^4$ is of determined tension relative to the pressure of air used in the practical operation of the apparatus.

To prevent the expansible member $h^3$ being raised, as by suction, to close opening $h^6$ when a low pressure obtains in pipe J, such expansible member may have its lower end enlarged, as at $h^7$, and washer $h^8$ placed thereover to come in contact with the shoulder obtained by such enlargement, and such washer may then be secured to the bottom of the chamber $h^5$.

In the modifications illustrated in Figs. 5 and 6 the steam for the steam heating device C is taken from the riser A through the same coupling (M) that the water of condensation is discharged from such steam heating device back into such riser, and hence a water-leg of the height obtained in the water-of-condensation-discharge pipe G in Fig. 1 is not required, the water-leg required to balance the resistance of the steam passing through the loop N or pipes N' n' being obtained in this construction, as well as the water seal required, by the construction about to be described. The steam-supply pipe D' is connected to the steam-supply riser A (through coupling M) in a plane not higher than will suffice to permit water of condensation to flow from the steam heating device C back into such riser; but such steam as is required in the steam heating device C after flowing into the pipe D' is conducted to substantially the same height as is the top of the steam heating device and back to connecting-pipe $D^2$, as by the loop N, Fig. 5, or the double pipe N' n', Fig. 6, and into the steam heating device. O, Fig. 5, and O', Fig. 6, are water seals. $O^2$ is a partition in water seals O O', respectively. These water seals are constructed so that the height of water at the discharge end thereof, as at $O^3$, is lower than the height of the water of condensation on the steam heating-device side or end thereof, as at $O^4$, such difference in height being sufficient to balance the difference in pressure of the steam between pipe D' and pipe $D^2$. Such difference in pressure is caused by the resistance presented by the loop N or pipes N' n'. Water of condensation will not therefore in the operation of these modifications dam up in pipe $D^2$ to prevent the flow of water of condensation from the steam heating device C back into riser A, and hence the operation is substantially the same as is the operation of the construction illustrated in Fig. 1 and hereinbefore described. In the modifications illustrated in Figs. 5 and 6, as well as the modification illustrated in Fig. 7 and about to be described, the thermostat device E is interposed between the steam-supply riser A and the steam heating device C in the same manner (and constructed and operated the same) as in the construction illustrated in Fig. 1, being placed adjacent to the steam heating device. An air-valve H is attached to discharge into the steam heating device at the other end thereof to that at which the steam-supply connecting-pipe discharges thereinto in the several modifications, the same as in the construction illustrated in Fig. 1.

In the modification illustrated in Fig. 7 this invention is shown embodied in a two-pipe system. The only change required in this construction from that shown in Fig. 1 is that the water-of-condensation-discharge pipe G' is taken from the return end of the steam heating device and extended to, to discharge into, a water-of-condensation reservoir P instead of being taken from the steam-supply end of such steam heating device and returned to the steam-supply riser A. The water-leg required to balance the steam-pressure required in the steam-supply connecting-pipe and the water seal for preventing the discharge of steam from the steam heating device through the water-of-condensation-discharge pipe are thus obtained.

By this invention in all the constructions shown and described the thermostat device becomes wholly immersed in air when air under pressure greater than is the pressure of the steam used for the heating agent is used as a fluid piston for forcing such steam out of the steam heating device before any of such air will flow by gravitation into the steam-supply riser A, and hence such thermostat will be effectually operated to close communication between the steam heating device and the steam-supply when in the operation of the apparatus such action is required. It will be observed that the water seal prevents the gravitation of air from the steam heating device into the steam-supply pipe at all times, in the construction illustrated in Figs. 1, 5, and 6, respectively, and that such water seal, in all the constructions shown and described, prevents the escape of air, by gravitation, from the steam heating device through the water-of-condensation-discharge pipe, and that air entering the steam heating device C through the valve H will therefore gradually rise in the steam heating device (and in the steam-supply connection-pipe D and loop N or pipes N′ n,′ in the modifications illustrated in Figs. 5 and 6, respectively,) until the steam heating device is substantially full of air, if necessary to maintain a uniform temperature in the space or chamber warmed by the apparatus.

The action occurring I apprehend to be as follows: Air entering the base of the radiator at I through valve H meets with resistance from the current of steam constantly existing in the bottom header of the radiator in supplying steam to the coils thereof for continuous conversion into water of condensation, and such current of steam will slightly bank the air, so that the lower ends of the upright coils which are adjacent to valve H will become submerged in air before the lower end of the coils which are adjacent to the connection D are submerged, whereupon (whether such coils do or do not communicate with each other at the tops thereof, as well as through the bottom header) such coils gradually become filled with air as all the steam therein becomes converted into water of condensation. The filling of the several coils with air will thus be progressive, starting from the end of the radiator which is adjacent to valve H and extending therefrom toward the end of the radiator adjacent to connection D. Several of the coils which are adjacent to valve H may thus become filled with air and additional ones partly filled with air before the lower end of the coil adjacent to connection D is submerged. In any event when, if at all, air flows out of the radiator through connection-pipe D and from thence into the water-of-condensation-discharge pipe G the discharge of such air through such pipe G into the riser A is prevented by the water seal B, and air will gradually rise in connection D until valve E is so submerged in air that the expansion member thereof becomes cool to contract and close the valve $e^6$ to its seat, at which time no additional air can be forced through such valve E into the radiator. The vertical portion of connection D forms the "dam," as it may be termed, which must be filled with air up to the joining of such connection-pipe D with riser A before any air can flow by gravitation from connection D to such riser, and thus by the combined action of the water-leg in the water-of-condensation-discharge pipe, the vertical portion of the connection-pipe D, and the valve H air under pressure greater than the pressure of the steam in the radiator will enter the radiator in quantity or volume to fill the radiator or less, as required, to automatically control the temperature of the chamber or space warmed by the heating apparatus; but air will not be delivered to such radiator in quantity or volume sufficient to flow therefrom into the steam-supply riser A. Further, if the air-supply to the radiator is too small to wholly take the place of the steam which is being converted to water of condensation steam will continue to pass into the radiator, and the thermostat-valve is not closed by the passage of such air into the radiator—that is, if air is not being supplied to the radiator as fast as the steam is being converted into water of condensation the thermostat-valve is not because steam is going through all the time into the radiator. If too large a supply of air flows into the radiator to take the place of the steam which is being converted into water of condensation, air will flow to the thermostat-valve and partially close it until a balance is established—that is, until the air-supply passing into the radiator equals in volume the steam lost by conversion of steam into water of condensation. If the thermostat-valve closes before the radiator is filled with air, then condensation of steam left in the radiator causes a vacuum in the radiator, and if any air has passed by the thermostat device into the steam-supply pipe it is drawn back into the radiator. Steam is also drawn back after the air has left the supply-pipe, and the thermostat-valve will be opened by such steam going into the radiator for more air to pass through the thermostat device into the radiator, and a balance will be established—that is, the action described opens or closes the air-inlet to obtain or admit an air-supply equal in volume to the condensation of steam which is taking place in the radiator. As a matter of fact, in the operation of the apparatus air and steam are hovering around the thermostat-valve, because as long as there is any steam in the radiator there will be condensation, and as long as there is condensation air will continue to enter the radiator to replace the steam condensed, or air and steam will enter, the air entering through the thermostat-valve from the compressed-air reservoir and steam from the steam-supply pipe, and such steam so entering will keep the valve in position for such air to enter, as described, and this action continues until the radiator is full of air, if such volume of air is necessary to establish the temperature desired in the chamber or space warmed by the radiator, air at no time going in any volume or for any distance beyond the thermostat-valve in the steam-supply pipe or connection.

Where the loop N or pipes N' n' are substituted for connection-pipe D or for the vertical portion thereof, air must rise therein before any air can flow by gravitation into the steam-supply pipe A from the radiator to a height sufficient to submerge valve E in the same manner and as effectually as in the last-above-recited construction.

In Fig. 8 there is shown a check-valve comprising shell or casing $B^2$ and check-valve $B^3$, which check-valve may be substituted for the water seal B to prevent the admission of steam from the steam-supply pipe (riser A) into the water-of-condensation-discharge pipe and from thence into the steam heating device. When this check-valve is substituted for the water seal B, it is located in substantially the same relative position to the water-leg of the water-of-condensation-discharge pipe and the riser as is the water seal B. The valve $B^3$ will then be maintained in a closed position by the pressure of the steam in the riser until the water column in the water-of-condensation-discharge pipe is high enough to overbalance such pressure and the force required to operate the valve, when the water of condensation will be delivered through the check-valve into the steam-supply pipe. This check-valve may also be placed in the water-of-condensation-discharge pipe of the return-pipe system (illustrated in Fig. 7 of the drawings) to prevent the passage of steam or air therethrough to the steam heating device.

Having thus described the invention, what I claim as new, and desire to secure by Letters Patent, is—

1. In a steam heating apparatus, the combination of a steam-supply pipe, a steam heating device, a branch pipe between the supply-pipe and the steam heating device means for discharging the water of condensation from the steam heating device, and means to prevent the flow of air from the steam heating device to the steam-supply pipe, an air-pipe leading to the steam heating device, and thermostatic-valve mechanism situated in the branch pipe to control the flow of air through said air-pipe, the arrangement of parts being such as to prevent the entrance of air to the steam-supply pipe.

2. In a steam heating apparatus, the combination of a steam-supply pipe, a steam heating device, a branch pipe between the supply-pipe and the steam heating device, a water-of-condensation-discharge pipe, means for preventing the flow of air, by gravity, from the heating device, an air-pipe leading to the steam heating device, and thermostatic-valve mechanism situated in the branch pipe, below the highest point thereof, to control the flow of air through the air-pipe.

3. In a steam heating apparatus, the combination of a steam heating device, a steam-supply pipe, a branch pipe connecting the steam heating device and the steam-supply pipe, a water-of-condensation-discharge pipe, means for balancing the pressure required to force steam from the steam-supply pipe through the connecting-pipe into the steam heating device whereby water of condensation may flow from such steam heating device, and means for preventing the flow of air by gravitation from the steam heating device through the pipe connecting such steam heating device to the steam-supply pipe and through the water-of-condensation-discharge pipe, an air-pipe leading to the steam heating device, and a thermostat device interposed in the pipe connecting the steam heating device with the steam-supply pipe, such thermostat device arranged to control the flow of air through said air-pipe; substantially as described.

4. In a steam heating apparatus, the combination of a steam heating device, a steam-supply pipe, a branch pipe connecting the steam heating device and the steam-supply pipe, a water-of-condensation-discharge pipe from the heating device to the steam-supply pipe, means for balancing by a water column, the pressure required to force steam from the steam-supply pipe through the connecting branch pipe into the steam heating device, whereby water of condensation may flow from such steam heating device into the steam-supply pipe and air cannot so flow, means for preventing the flow of air by gravitation from the steam heating device through the branch pipe to the supply-pipe, an air-pipe leading to the steam heating device, and a thermostatic-valve mechanism interposed in the branch pipe, arranged to control the flow of air through the air-pipe.

5. In a steam heating apparatus, the combination of a steam heating device, a steam-supply pipe, a pipe connecting the steam-supply pipe and the steam heating device, an air-pipe leading to the steam heating device, a water-of-condensation-discharge pipe from the steam heating device, means for preventing the flow of air by gravitation from the steam heating device through the water-of-condensation-discharge pipe, a thermostat device interposed in the pipe connecting the steam-supply pipe with the steam heating device and arranged to control the admission of air through the air-pipe to such steam heating device, and an air-valve arranged to automatically close and prevent the passage of steam therethrough from the steam heating device to the air-pipe discharging thereinto; substantially as described.

6. In a steam heating apparatus, the combination of a steam-supply pipe, a steam heating device, a pipe connecting the steam-supply pipe with the steam heating device, means for supplying air to the steam heating device and means for withdrawing air therefrom, means for preventing the flow of air by gravitation from the steam heating device to the steam-supply pipe, means for preventing the flow of steam from the steam heating device to the air supply and discharge pipe, means for automatically closing the air-supply pipe against the admission of air to the steam heating device when a determined quantity of air is contained therein, and means for balancing the difference in pressure of steam at the steam-supply pipe and the return end of the steam heating device so that water of condensation may flow freely from such steam heating device; substantially as described.

7. In a steam heating apparatus, the combination of a steam-supply pipe, a steam heating device, a pipe connecting the steam-supply pipe with the steam heating device, means interposed in such connecting-pipe for conducting the steam to a plane of a height equal, substantially, to the height of a determined volume of air forming a fluid piston in the steam heating device, a thermostat device interposed in the connecting-pipe, such thermostat device comprising a chamber through which steam passing into the steam heating device passes, a second chamber the temperature whereof is varied by steam passing through the device and the expulsion of steam therefrom, a valve-seat, a valve therefor and an expansion member for such second chamber, and a water-of-condensation-discharge pipe, a balance in such discharge-pipe, and means for preventing the passing of steam through the discharge-pipe from the steam-supply pipe to the steam heating device; substantially as described.

8. In a steam heating apparatus, the combination of a steam-supply pipe, a steam heating device, a branch pipe between the supply-pipe and the steam heating device, such branch pipe attached to the supply-pipe at a point substantially as high as the top of the steam heating device, a water-of-condensation-discharge pipe, means in such discharge-pipe to prevent the flow of air therethrough from the steam heating device, an air-pipe leading to the steam heating device, and thermostatic-valve mechanism, comprising a chamber, a second chamber provided with an inlet and an outlet, the temperature of the second chamber controlled by the contents of the first-named chamber, a valve-seat, a valve and an expansible member in the second chamber, situated in the branch pipe, below the point of communication of such branch pipe with the supply-pipe.

Signed at Chicago, Illinois, this 18th day of September, A. D. 1898.

EUGENE F. OSBORNE.

In presence of—
CHARLES TANNER BROWN,
FLORA L. BROWN.